United States Patent Office 2,933,383
Patented Apr. 19, 1960

2,933,383

METHOD OF COMBATING WEEDS USING N-SUBSTITUTED CARBAMATES OF 2,4,5-TRICHLORO, 6-NITRO PHENOL

Joseph A. Lambrech, Charleston, W. Va., assignor to Union Carbide Corporation, a corporation of New York No Drawing. Application November 23, 1956
Serial No. 623,825

7 Claims. (Cl. 71—2.6)

This invention relates to new compositions of matter, a method for their preparation and to herbicidal compositions containing them. More particularly, the present invention relates to aryl N-alkylcarbamates, as new compositions of matter, to a method for preparing them and to herbicidal compositions containing them.

The compounds of the present invention may be represented by the general formula:

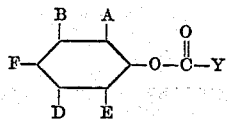

wherein A is a member selected from the group consisting of hydrogen, nitro, halogen, and alkyl containing from 1 to 4 carbon atoms, inclusive; B is a member selected from the group consisting of hydrogen, halogen and methyl; D is a member selected from the group consisting of hydrogen, chlorine, and methyl; F is a member selected from the group consisting of nitro, halogen and methyl; E is a member selected from the group consisting of hydrogen, nitro and halogen; said A, B, F, D and E containing at least one member selected from the group consisting of nitro and halogen; and Y is a nitrogen-containing radical selected from the group consisting of

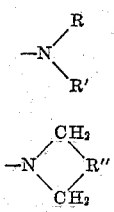

wherein R is a member selected from the group consisting of hydrogen, alkyl containing from 1 to 8 carbon atoms, inclusive, and alicyclic radicals containing from 5 to 6 carbon atoms, inclusive; R' is a member selected from the group consisting of hydrogen, hydroxyl and alkyl containing from 1 to 8 carbon atoms, inclusive; and R" is a member selected from the group consisting of

and
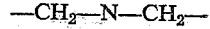

Illustrative examples of said compounds are:

| Compound No. | Formula | Name |
|---|---|---|
| 1 | 4-Cl-C6H4-OCON(CH3)2 | 4-Chlorophenyl N,N-dimethylcarbamate; B. Pt. 108–110°/2 mm. Hg; Sp. G. 1.234 20° C./20° C. |
| 2 | 2,4-Cl2-C6H3-OCON(CH3)2 | 2,4-Dichlorophenyl N,N-dimethylcarbamate; B. Pt. 120–123°/3 mm. Hg. |
| 3 | 3-Cl-C6H4-OCON(CH3)2 | 3-Chlorophenyl N,N-dimethylcarbamate; B. Pt. 105–107°/2 mm. Hg; Sp. G. 1.226 20°/20° C. |
| 4 | 2-NO2-C6H4-OCON(CH3)2 | 2-Nitrophenyl N,N-dimethylcarbamate; B. Pt. 142°/3 mm. Hg; Sp. G. 1.245 20°/20° C. |
| 5 | 2-Cl-C6H4-OCON(CH3)2 | 2-Chlorophenyl N,N-dimethylcarbamate; B. Pt. 112°/2 mm. Hg. |
| 6 | 2,4-(NO2)2-C6H3-OCON(CH3)2 | 2,4-Dinitrophenyl N,N-dimethylcarbamate; M.P.= 192° C. |

| Compound No. | Formula | Name |
|---|---|---|
| 7 | 2,4-dichloro-6-nitro phenyl with OCON(CH₃)₂ | 2,4-Dichloro-6-nitro N,N-dimethylcarbamate; B. Pt. 148–149°/2 mm. Hg; M.P. 81° C. |
| 8 | 2-nitro-4-chlorophenyl OCON(CH₃)₂ | 2-Nitro-4-chlorophenyl N,N-dimethylcarbamate; B. Pt. 150–152°/1.5 mm. Hg; M.P. 88° C. |
| 9 | 2-nitrophenyl morpholinyl carboxylate structure | 2-Nitrophenylmorpholinyl N-carboxylate; B. P. 192° at 2.5 mm. Hg; M.P. 81° C. |
| 10 | 4-chloro-3,5-dimethylphenyl OCON(CH₃)₂ | 4-Chloro-3,5-dimethylphenyl-N,N-dimethylcarbamate; M.P.=88° C. |
| 11 | 2,4-dinitrophenyl N,N-diisopropylcarbamate structure | 2,4-Dinitrophenyl N,N-diisopropylcarbamate; M.P.=100° C. |
| 12 | pentachlorophenyl OCON(CH₃)₂ | Pentachlorophenyl N,N-dimethylcarbamate; M.P.=148° C. |
| 13 | 2,4-dinitrophenyl OCON(C₄H₉)₂ | 2,4-Dinitrophenyl N,N-dibutylcarbamate; M.P.=114° C. |
| 14 | 2,4,5-trichloro-6-nitrophenyl OCON(CH₃)₂ | 2,4,5-Trichloro-6-nitrophenyl N,N-dimethylcarbamate; M.P.=170° C. |
| 15 | 2-methyl-4,6-dinitrophenyl OCON(CH₃)₂ | 2-Methyl-4,6-dinitrophenyl N,N-dimethylcarbamate; M.P.=90° C. |

| Compound No. | Formula | Name |
|---|---|---|
| 16 | Cl—⟨phenyl with CH₃⟩—O—CO—N—(CH₃)₂ | 4-Chloro-3-methylphenyl N,N-dimethylcarbamate; B.P. 143° C. at 3 mm. Hg; Sp. G. 1.211 20°/20° C. |
| 17 | Cl,NO₂,Cl-substituted phenyl—O—CO—N—[CH—(CH₃)₂]₂ | 2,4,5-Trichloro-6-nitrophenyl-N,N-diisopropylcarbamate; M.P.=130° C. |
| 18 | Naphthyl with OCON(CH₃)₂, NO₂, NO₂ | 2,4-Dinitro-1-naphthyl N,N-dimethylcarbamate; M.P.=200° C. |
| 19 | O₂N, Cl, Cl, Cl phenyl with OCONHCH₃ | 2,4,5-Trichloro-6-nitrophenyl N-methylcarbamate; M.P. 155–160° C. |
| 20 | O₂N, Cl, Cl, Cl phenyl with OCON(C₈H₁₇)₂ | 2,4,5-Trichloro-6-nitrophenyl N,N-Di(2-ethylhexyl)-carbamate; Residue. |
| 21 | O₂N, Cl, Cl, Cl phenyl with OCONHCH₂CH₂N(CH₃)₂ | 2,4,5-Trichloro-6-nitrophenyl N,N-(N',N'-dimethylaminoethyl)carbamate; Residue. |
| 22 | O₂N, Cl, Cl, Cl phenyl with OCON(CH₂CH₂OH)₂ | 2,4,5-Trichloro-6-nitrophenyl N,N-di-(2-hydroxyethyl)-carbamate; M.P.=147° C. |
| 23 | O₂N, Cl, Cl, Cl phenyl with OCONHCH₂CH₂OH | 2,4,5-Trichloro-6-nitrophenyl N-(2-hydroxyethyl)carbamate; M.P.=170° C. |
| 24 | O₂N, Cl, Cl, Cl phenyl with OCON(C₄H₉)₂ | 2,4,5-Trichloro-6-nitrophenyl N,N-dibutylcarbamate; M.P.=140° C. |
| 25 | Two O₂N, Cl, Cl, Cl phenyl rings joined by OCONHCH₂CH₂NHCOO | Di(2,4,5-trichloro-6-nitrophenyl) N,N'-ethylenebiscarbamate; M.P.=225° C. dec. |

| Compound No. | Formula | Name |
|---|---|---|
| 26 | 2,4,5-trichloro-6-nitrophenyl OCON(C₈H₁₇)(CH(CH₂CH₃)CH=CH) structure | 2,4,5-Trichloro-6-nitrophenyl N-(2-cyclopentenyl)N-(2-ethylhexyl)carbamate; Residue. |
| 27 | 2,4,5-trichloro-6-nitrophenyl OCON(CH₃)(CH(CH₂CH₃)CH=CH) structure | 2,4,5-Trichloro-6-nitrophenyl N-(2-cyclopentenyl)-N-methyl carbamate; Residue. |
| 28 | 2,4,5-trichloro-6-nitrophenyl OCONHOH structure | 2,4,5-Trichloro-6-nitrophenyl N-hydroxycarbamate; M.P.=142° C. |
| 29 | 2,4,5-trichlorophenyl OCONHCH₃ structure | 2,4,5-Trichlorophenyl N-methylcarbamate; B.P. 100–105°/2.5 mm.; Sp. G. 1.392 20°/20° C. |
| 30 | 2,4,5-trichlorophenyl OCONHOH structure | 2,4,5-Trichlorophenyl N-hydroxycarbamate; M.P.= 102° C. |
| 31 | 2,4,5-trichloro-6-nitrophenyl OCONH₂ structure | 2,4,5-Trichloro-6-nitrophenyl carbamate; M.P.=196° C. |

The present compounds may be prepared by reacting phosgene with a substituted sodium phenolate to form a phenoxy, carbonyl chloride. This acid chloride is then reacted with an amine to form the carbamate. The following equations graphically illustrate these reactions:

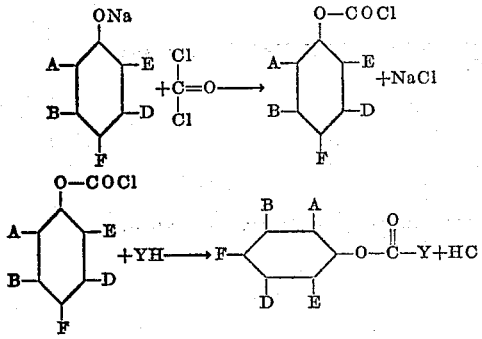

wherein A, B, F, D, E and Y have the same meanings as given in columns 1 and 2, lines 27–30 and 1–29 of this specification.

The reaction of phosgene with sodium phenolate is most readily conducted in the presence of an inert solvent such as, toluene, benzene or dioxane. The reaction is slightly exothermic and, since it should preferably be conducted at −10° C. to +10° C., some external cooling is necessary. The chloroformate may be used as residue product, without further purification, but can be isolated by distillation, if desired.

The reaction of the chloroformate with ammonia or an amine can be carried out in presence of solvents, such as water and dioxane. The reaction should be conducted at a temperature in the range of 15° C. to 50° C. Below 15° C. the reaction rate is too slow and above 50° C. the reaction rate is so rapid that loss of the low boiling amines occur and some decomposition takes place.

For the most part, the compounds of this invention are crystalline solids which can be isolated by filtration or centrifugation and dried. They are insoluble or only slightly soluble in water and benzene.

The following examples are illustrative of the preparation of the compounds of this invention.

EXAMPLE 1

2,4,5-trichloro-6-nitrophenyl chloroformate was prepared by slowly adding 60 parts of phosgene to 500 parts of toluene at −10° C. The phosgene, toluene mixture was allowed to warm up to 0° C. and then 132 parts of sodium 2,4,5-trichloro-6-nitrophenolate was added through a powder funnel. The reaction is exothermic so that it is necessary to apply external cooling to maintain the reaction temperature at 0° C. An additional amount of phosgene, about 20 grams was added to the reaction mixture to complete the reaction. The sodium chloride that was formed was removed by filtration, the toluene was removed by distillation and the residue was heated to 90° C. at 2 mm. Hg to remove any low boiling material. The 2,4,5-trichloro-6-nitrophenyl chloroformate is used in the synthesis of the carbamates without further purification and is taken as the residue from the above described distillation.

2,4,5-trichloro-6-nitrophenyl N,N-dimethylcarbamate was prepared by adding dropwise 0.46 gram moles of 2,4,5-trichloro-6-nitrophenyl chloroformate to a mixture of 1 gram mole of dimethylamine and 300 cc. of dioxane at 25° C. After the addition of the chloroformate, the reaction mixture was heated at 55° C. for one hour. The mixture was cooled to 20° C. and the dimethylamine hydrochloride was removed by filtration. The dioxane was then removed by distillation. The product crystallized on cooling. It was washed with about 150 cc. of water and dried. It is a yellow crystalline solid which melts at 170° C.

EXAMPLE 2

2,4,5-trichloro-6-nitrophenyl N-methylcarbamate was prepared by slowly adding 152 grams of 2,4,5-trichloro-6-nitrophenyl chloroformate to a mixture of 100 grams of a 39 percent water solution of methylamine and 100 grams of water at 25° C. After the addition of the chloroformate, the mixture was heated at 50° C. for one hour. Upon cooling a solid precipitated. It was filtered from the mother liquor washed with several 200 cc. portions of water and air dried. This solid is a product which melts at 155° C. with decomposition. Nitrogen analysis, found 9.4 percent; theory 9.8 percent.

EXAMPLE 3

2,4,5-trichloro-6-nitrophenyl carbamate was prepared by slowly adding 151 grams of 2,4,5-trichloro-6-nitrophenyl chloroformate to a mixture of 150 grams of a 28 percent water solution of ammonia and 100 grams of water at 20–25° C. After the addition of the chloroformate, the mixture was gradually heated to 40° C. and held at that temperature for 30 minutes. The reaction mixture was then cooled to 10° C. and the solid which separated was filtered from the mother liquor, washed with water and air dried. The recovered product is a crystalline solid which melts at 196° C.

EXAMPLE 4

2-nitrophenyl chloroformate was prepared by heating 42 parts of sodium hydroxide, 139 parts of 2-nitrophenol, and 800 parts of water at 80° C. for one hour. The sodium 2-nitrophenolate solution was cooled to 25° C. and then 100 parts of phosgene in 300 parts of toluene was added dropwise through a dropping funnel. The reaction is exothermic so that it is necessary to apply external cooling to maintain the reaction temperature at 25° C. The toluene layer was separated from the water layer and the toluene layer was distilled. The 2-nitrophenyl chloroformate is a light yellow liquid which boils at 105° C. at 2 mm. Hg.

EXAMPLE 5

2-nitrophenyl N,N-dimethylcarbamate was prepared by adding dropwise 86 parts of 2-nitrophenyl chloroformate to a mixture of 42 parts of dimethylamine and 300 parts of dioxane at 25° C. After the addition of the chloroformate, the reaction mixture was heated at 50° C. for one hour. The mixture was cooled to 20° C. and the dimethylamine hydrochloride was removed by filtration. The reaction mixture was then distilled in a one foot unpacked column. The 2-nitrophenyl N-dimethylcarbamate is a light yellow liquid which boils at 143° C. at 3 mm. Hg and has a specific gravity of 1.245 at 20° C.

EXAMPLE 6

2-nitrophenyl-morpholinyl-N-carboxylate was prepared by slowly adding 101 parts of 2-nitrophenyl chloroformate to a mixture of 87 parts morpholine and 400 parts of dioxane at 30° C. After the addition of the chloroformate, the reaction mixture was heated at 50° C. for one hour. The mixture was cooled to 20° C. and the morpholine hydrochloride was removed by filtration. The dioxane was removed by distillation and the product distilled in a one foot unpacked column. The 2-nitrophenyl morpholinyl-N-carboxylate is a light yellow solid which boils at 192° C. at 2.5 mm. Hg and melts at 81° C.

EXAMPLE 7

2,4-dinitrophenyl chloroformate was prepared by slowly adding 220 parts of phosgene to 2000 parts of toluene at −10° C. The phosgene, toluene mixture was allowed to warm up to 0° C. and then 492 parts of sodium 2,4-dinitrophenolate was added through a powder funnel. The reaction is exothermic so that it is necessary to apply external cooling to maintain the reaction temperature at 0° C. The sodium chloride that was formed was removed by filtration, the toluene was removed by distillation and the residue was heated to 80° C. at 2 mm. Hg to remove any low boiling material. The 2,4-dinitrophenyl chloroformate is used in the synthesis of the carbamates without further purification and is taken as the residue from the above described distillation.

2,4-dinitrophenyl N-N-dimethylcarbamate was prepared by adding dropwise 123 parts of 2,4-dinitrophenyl chloroformate to a mixture of 50 parts dimethylamine and 500 parts dioxane at 25° C. After the addition of the chloroformate, the reaction mixture was heated at 50° C. for one hour. The product crystallized on cooling. It was washed thoroughly with water to remove the dimethylamine hydrochloride. The 2,4-dinitrophenyl N-dimethylcarbamate was then dried. It is a yellow crystalline solid which melts at 192° C.

EXAMPLE 8

2,4-dinitrophenyl diisopropylcarbamate was prepared by adding dropwise 123 parts of 2,4-dinitrophenyl chloroformate to a mixture of 111 parts of diisopropylamine and 500 parts dioxane at 30° C. After the addition of the chloroformate, the reaction mixture was heated at 30° C. for one hour. The mixture was cooled to 20° C. and the dimethylamine hydrochloride was removed by filtration. The dioxane was then added to 1500 parts of water and the crystals which formed were filtered and dried. 2,4-dinitrophenyl diisopropylcarbamate is a yellow solid which melts at 100° C.

EXAMPLE 9

2,4,5-trichloro-6-nitrophenyl N-cyclopentenyl N-2-ethylhexylcarbamate was prepared by adding dropwise 75 parts 2,4,5-trichloro-6-nitrophenyl chloroformate to a mixture of 98 parts cyclopentenyl 2-ethylhexylamine and 300 parts of dioxane at 25° C. After the addition of the chloroformate, the reaction mixture was heated at 45° C. for one hour. The dioxane was then removed by distillation. Product dissolved in ethyl ether and washed thoroughly with water to remove the cyclopentenyl 2-ethylhexylamine hydrochloride. Ethyl ether then removed by distillation and the residue was heated to 90° C. at 5 mm. Hg to remove any low boiling material. The 2,4,5-trichloro-6-nitrophenyl N-cyclopentenyl N-2-ethylhexylcarbamate is a dark viscous liquid and is a residue product.

EXAMPLE 10

2,4,5-trichloro-6-nitrophenyl N-hydroxycarbamate was prepared by adding dropwise 152 parts of 2,4,5-trichloro-6-nitrophenyl chloroformate to a mixture of 69 parts of hydroxylamine hydrochloride, 40 parts sodium hydroxide, and 400 parts water at 25° C. After the addition of the chloroformate, the reaction mixture was heated at 60° C. for one hour. The mixture was cooled to 20° C. and the product crystallized. It was washed with about 1000 parts of water to remove the hydroxylamine hydrochloride and product dried. It is a light red crystalline solid which melts at 142° C.

The compounds of the present invention can be incorporated with various materials to prepare new herbicidal compositions, either in liquid or solid form. These herbicidal compositions are applied either as sprays or dusts to the area to be protected from undesirable plant growth. They are effective for the pre-emergence suppression of weeds and can also be applied as aqueous foliage sprays to control established weeds selectively, that is without injury to the crop plant. These compositions are particularly effective for the control of weeds in planting such as corn, snapbeans and soybeans.

The herbicidal dust compositions are compounded to give homogeneous, free flowing dusts by mixing the carbamates with finely divided inert solids or extenders such as talcs, natural clays, diatomaceous earth, pyrophyllite and flours such as cottonseed and walnut shell flours.

Concentrated water dispersible liquid compositions can be prepared by incorporating with the carbamates various organic liquid diluents such as acetone, methyl ethyl ketone, cyclohexanone, isopropanol and dimethyl formamide.

To secure homogeneous dispersions of the solid or liquid formulations of the herbicidal compositions, a surface active agent should preferably be used. These agents cause the compositions to be easily dispersed in water to give aqueous sprays which constitute a desirable method of application. The surface active agents employed can be of the anionic, cationic or nonionic type and include, for example, sulfonated animal and vegetable oils, sulfonated petroleum oils, sodium lauryl sulfate, glycerol monostearate ethylene oxide condensation products with octylphenol, lauryl pyridinium bromide and cetyldimethylbenzyl ammonium chloride. The surface active agent, when used, should comprise from 1 percent to 15 percent by weight of the composition.

The percentage by weight of the essential active ingredients may vary according to the manner in which the composition is to be applied but, in general should comprise 0.5 to 95 percent by weight of the herbicidal composition.

The relative activity of the various carbamate derivatives is shown by the following experimental evidence:

Test as Germinative Seed Toxicants

This test involves the planting of 25 radish and 25 rye grass seeds in 4-inch diameter clay pots. Three hours after seeding, 45 cc. of a 0.1 percent solution or suspension of the chemical is applied to the soil surface of the pot. Seven days after this treatment, data relative to the number of seedlings germinated are recorded. The results of a series of tests, using the chemicals as identified previously by number, are set forth in Table I.

TABLE I

| Number | Percent Germination | |
|---|---|---|
|  | Radish | Rye Grass |
| Check; no treatment | 84 | 80 |
| 1 | 72 | 40 |
| 2 | 72 | 48 |
| 3 | 48 | 12 |
| 4 | 44 | 52 |
| 5 | 64 | 68 |
| 6 | 0 | 4 |
| 7 | 84 | 0 |
| 8 | 88 | 0 |
| 9 | 24 | 64 |
| 10 | 96 | 0 |
| 12 | 64 | 36 |
| 13 | 36 | 24 |
| 14 | 4 | 0 |
| 15 | 72 | 40 |
| 16 | 60 | 60 |
| 17 | 60 | 44 |
| 18 | 16 | 24 |
| 19 | 0 | 0 |
| 20 | 36 | 40 |
| 21 | 4 | 0 |
| 22 | 0 | 0 |
| 23 | 0 | 0 |
| 24 | 0 | 8 |
| 25 | 0 | 0 |
| 26 | 36 | 20 |
| 27 | 68 | 76 |
| 28 | 0 | 0 |
| 29 | 84 | 24 |
| 30 | 80 | 8 |
| 31 | 0 | 20 |

A series of tests were conducted in the field in plots of 16 square feet, for pre- and postemergence selective seeding of corn, snapbeans and soybeans. The compounds tested were applied to the fields in aqueous media at the indicated dosages. The weed ratings and crop response values were determined by comparison with control plots. The results are given in Table II. The abbreviations used in Table II are as follows:

| Weed Rating | Crop Response |
|---|---|
| 1—Good Control. | A—No injury. |
| 2—Fair Control. | B—Slight injury. |
| 3—None. | C—Moderate injury. |
|  | D—Severe injury. |
|  | E—Plant dead. |

TABLE II

| Cmpd. No. | Dosage, lbs. per acre | Pre-Emergence | | | |
|---|---|---|---|---|---|
|  |  | Weed Rating | Crop Response | | |
|  |  |  | Corn | Soy Bean | Snap Bean |
| 7 | 10 | 1 | A | A | A |
| 6 | 10 | 1 | A | A | A |
| 14 | 5 | 1 | A | A | A |
|  | 10 | 1 | A | B | A |
| 12 | 10 | 1 | A | C | C |

Unless otherwise specified, all parts and percentages, as used throughout this specification, are by weight.

I claim:
1. The method of combatting weeds which comprises applying to a locus to be protected a herbicidal amount of a compound having the general formula:

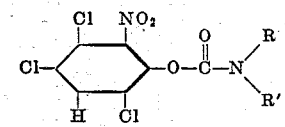

wherein R is selected from the group consisting of hydrogen, lower alkyl and hydroxyl substituted lower alkyl and R' is a member selected from the group consisting of hydrogen, hydroxyl, lower alkyl and hydroxyl substituted lower alkyl.

2. An aryl N-alkyl carbamate having the general formula:

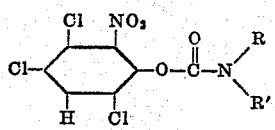

wherein R is selected from the group consisting of hydrogen, lower alkyl and hydroxyl substituted lower alkyl and R' is a member selected from the group consisting of hydrogen, hydroxyl, lower alkyl and hydroxyl substituted lower alkyl.

3. 2,4,5-trichloro - 6 - nitrophenyl N,N - dimethylcarbamate.

4. 2,4,5-trichloro-6-nitrophenyl N-methylcarbamate.

5. 2,4,5-trichloro - 6 - nitrophenyl N,N-di-(2-hydroxyethyl)carbamate.

6. 2,4,5-trichloro-6-nitrophenyl carbamate.

7. 2,4,5-trichloro-6-nitrophenyl N,N-dibutylcarbamate.

References Cited in the file of this patent

UNITED STATES PATENTS

| | | |
|---|---|---|
| 1,252,451 | Kropp | Jan. 8, 1918 |
| 2,209,245 | Bartholomaus | July 23, 1940 |
| 2,776,197 | Gysin et al. | Jan. 1, 1957 |
| 2,791,603 | Bavley et al. | May 7, 1957 |

FOREIGN PATENTS

| | | |
|---|---|---|
| 450,184 | Germany | Oct. 1, 1937 |
| 128,292 | Sweden | May 30, 1950 |
| 1,031,976 | France | Dec. 24, 1954 |
| 1,101,980 | France | Oct. 12, 1955 |

OTHER REFERENCES

Beilstein, vol. 6 (2nd ed.), pp. 172 and 224.
Beilstein, vol. 6 (4th ed.), p. 233.
Kolbezen: J. Agr. Food Chem., vol. 2, pp. 864–70 (1954).